Dec. 14, 1926.
G. G. REEVES
BEARING FOR SHAFTS
Filed Feb. 6, 1926
1,610,321
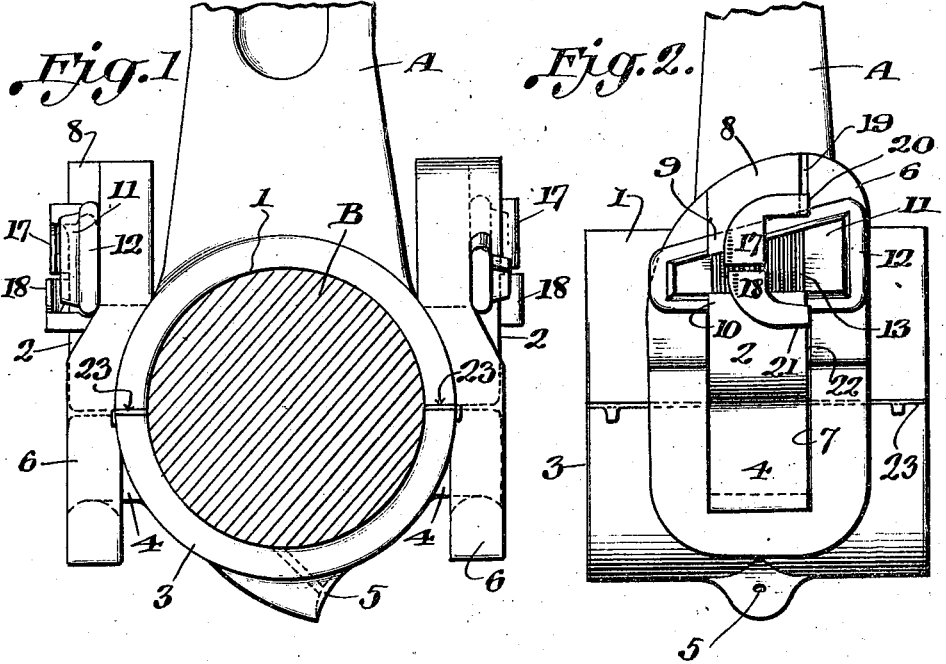
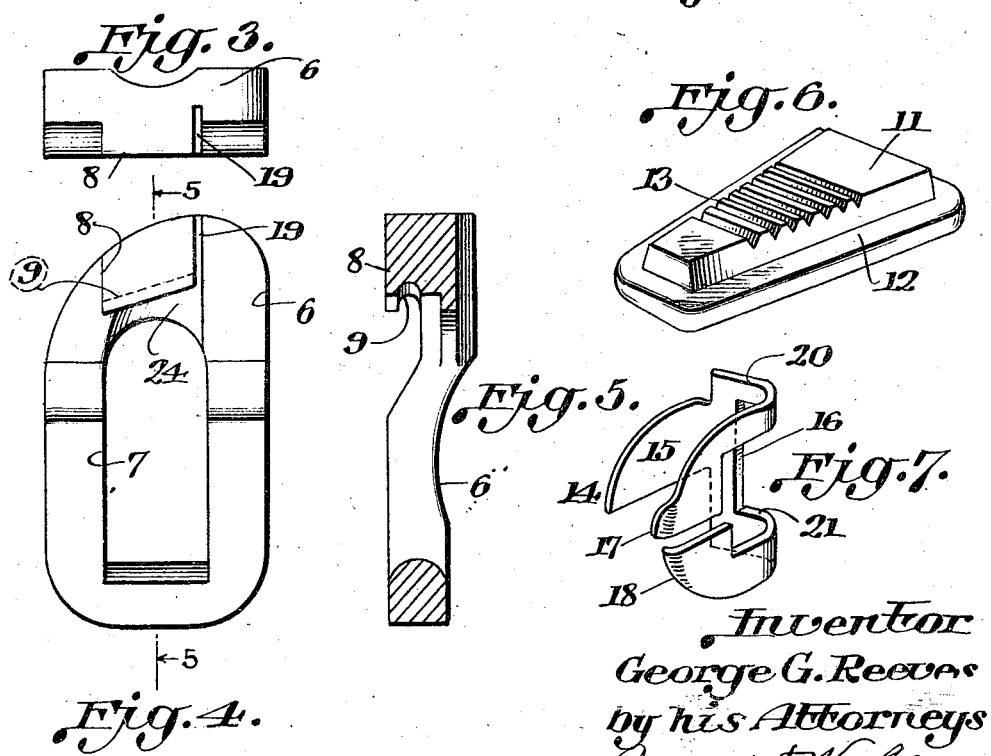
Inventor
George G. Reeves
by his Attorneys Patented Dec. 14, 1926.

1,610,321

UNITED STATES PATENT OFFICE.

GEORGE G. REEVES, OF SHREVEPORT, LOUISIANA.

BEARING FOR SHAFTS

Application filed February 6, 1926. Serial No. 86,505.

This invention relates to bearings for rotating shafts in which the two parts of a separable bearing are held firmly in operative position by means which can be readily released to permit the parts to be disassembled, said means being also readily adjustable to take up wear or to render the bearing applicable to shafts which may differ slightly in size. Although applicable to devices of widely different character, the invention is illustrated in connection with a connecting rod which may be that employed in automobile engines or similar machines.

In the drawings:

Figure 1 is an elevation of the bearing, with the rotating shaft in cross section.

Figure 2 is an elevation of the bearing viewed at substantially right angles to Figure 1.

Figure 3 is a top plan view of one of the connecting members for the two parts of the bearing.

Figure 4 is a side elevation of the same.

Figure 5 is a section on the line 5—5 of Figure 4.

Figure 6 is a perspective view of a locking wedge.

Figure 7 is a perspective view of a holding pawl member employed in connection with the wedge.

There is illustrated a portion of a connecting rod A having formed at one end thereof the usual semi-cylindrical bearing portion 1 which is provided at opposite sides with projecting means 2. A corresponding semi-cylindrical portion 3 is provided at opposite sides with ears 4 which oppose the ears 2 of the other member. This member is also provided with an oiling opening 5. When the two members 1 and 3 are held together they provide a cylindrical bearing for the usual shaft B.

A holding member 6 is provided for each pair of ears 2 and 4 and since these are the same at both sides, it is only necessary to describe one of these members. The holding member 6 has an elongated central opening 7, slightly wider than the width of the ears 2 and 4 and adapted to receive the same, the lower portion of the opening bearing against the under edge of the ear 4. This opening, however, is considerably longer than the corresponding dimensions of the ears 2 and 4 and the member 6 has at this side thereof a central projecting portion 8 having an undercut edge 9 as shown in Figures 4 and 5. The edge of the ear 2 on the side opposing the undercut portion 9 may also be correspondingly undercut as indicated at 10 in Figure 2.

There is provided for use with each holding member 6 a wedge such as indicated in Figure 6. This wedge 11 has a margin 12 and a central thicker portion provided with grooves 13. When the wedge is moved into position as shown in Figure 2, the margin 12 fits in the undercut portions 9 and 10 and prevents accidental movement of the wedge at an angle to its direction of entry. Each wedge is held against accidental removal toward the right in Figure 2 by the following means.

A retaining member 14 such as shown in Figure 7 is stamped out of sheet metal and bent to the form there illustrated or one equivalent thereto. This has a base portion 15 extending to one side of a cross bar 16 and from this cross bar rise narrow strips 20 and 21 which connect to pawl members 17 and 18 bent over to lie approximately parallel to the base 15. These pawl members are so formed that one lies slightly in advance of the other, as clearly shown in Figure 2, for a purpose hereinafter set forth. When the parts are assembled the member 6 is placed in position surrounding a pair of ears 2 and 4 and the retaining member 14 is placed so that the base portion 15 lies over the cut out 24 in the member 6, as indicated in Figure 4, while the connecting portion 20 fits in a slot 19 cut at the edge of the projecting part 8 of the member 6. The other connecting portion 21 of the member 14 fits between the ear 2 and the opposite portion of the member 6. After this holding member is thus placed in position, the wedge is inserted and moved toward the left in Figure 2. This results in drawing the ears 2 and 4 toward each other and thus holding the parts 1 and 3 of the bearing in proper relation to form a cylindrical bearing. When the wedge is in position if the end of the pawl member 17 drops into one of the grooves 13, the end of the pawl member 18 will rest on the top of one of the ridges intermediate said grooves, ready to drop into the next groove, if the wedge is moved slightly further. This enables a finer adjustment to be obtained by the use of relatively large and strong grooves and ridges. It will be seen that the undercut portions 9 and 10 prevent the removal of the wedge in one direction, while the retaining member 14 prevents accidental displacement in the other direction, although the wedge can be readily removed when desired.

If desired shims 23 may be placed between the two sides of the bearing and similar expedients may be adopted elsewhere as desired. It is obvious that the form of the wedge may be varied and the precise form of the retaining members 14 may also be varied and numerous other details of construction can be changed without departing from the spirit of the invention, which is to be regarded as limited only by the scope of the appended claims.

I claim:

1. A shaft bearing comprising a pair of semi-cylindrical bearing members, an ear on each side of each bearing member, and means at each side for holding said bearing members in operative relation, each of said means comprising a holding device adapted to embrace an ear of each member, a wedge adapted to fit between one ear and a portion of the cooperating holding device and draw the bearing members toward each other, and means for retaining the wedge against accidental displacement.

2. A shaft bearing comprising a pair of semi-cylindrical bearing members, an ear on each side of each bearing member, and means at each side for holding said bearing members in operative relation, each of said means comprising a holding device adapted to embrace an ear of each member, said holding device and one of said ears having an undercut portion, a wedge adapted to engage in said undercut portions and draw the bearing members toward each other, and means for retaining the wedge against accidental displacement.

3. A shaft bearing comprising a pair of semi-cylindrical bearing members, an ear on each side of each bearing member, and means at each side for holding said bearing members in operative relation, each of said means comprising a holding device adapted to embrace an ear of each member, said holding device and one of said ears having an undercut portion, a wedge adapted to engage in said undercut portions and draw the bearing members toward each other, and a pawl member positioned by said holding member and ear and engaging the wedge to retain it against accidental displacement.

4. A shaft bearing comprising a pair of semi-cylindrical bearing members, an ear on each side of each bearing member, and means at each side for holding said bearing members in operative relation, each of said means comprising a holding device adapted to embrace an ear of each member, said holding device and one of said ears having an undercut portion, a wedge adapted to engage in said undercut portions and draw the bearing members toward each other, said wedge having grooves therein, and a pawl member engaging said grooves to retain the wedge against accidental displacement.

5. A shaft bearing comprising a pair of bearing members, an ear on each side of each bearing member, and means at each side for holding said bearing members in operative relation, each of said means comprising a holding device having a central elongated opening adapted to fit over an ear of each member, said opening being larger than is necessary to receive said ears, and a wedge adapted to fit between one ear and a lug on said holding device to draw the bearing members toward each other.

6. A shaft bearing comprising a pair of bearing members, an ear on each side of each bearing member, and means at each side for holding said bearing members in operative relation, each of said means comprising a holding device having a central elongated opening adapted to fit over an ear of each member, said opening being larger than is necessary to receive said ears, a wedge adapted to fit between one ear and a lug on said holding device to draw the bearing members toward each other, and means for retaining the wedge against accidental displacement.

7. A shaft bearing comprising a pair of bearing members, an ear on each side of each bearing member, and means at each side for holding said bearing members in operative relation, each of said means comprising a holding device having a central elongated opening adapted to fit over an ear of each member, said opening being larger than is necessary to receive said ears, a wedge adapted to fit between one ear and a lug on said holding device to draw the bearing members toward each other, means for retaining the wedge against accidental displacement, and a pawl member positioned by said ear and device and acting to retain the wedge against accidental displacement.

In testimony whereof, I have hereunto subscribed my name.

GEORGE G. REEVES.